United States Patent [19]

Kimura

[11] Patent Number: 5,133,589
[45] Date of Patent: Jul. 28, 1992

[54] PIVOTING SEAT AND PIVOTING BACKREST HAVING COOPERATING LATCH MEANS

[75] Inventor: Kazuomi Kimura, Akishima, Japan
[73] Assignee: Tachi-S Co., Ltd., Tokyo, Japan
[21] Appl. No.: 492,654
[22] Filed: Mar. 13, 1990
[51] Int. Cl.⁵ .................................................. A47C 15/00
[52] U.S. Cl. ............................................ 297/335; 296/65.1
[58] Field of Search ................................... 297/334-336; 296/65.1, 68.1, 69

[56] References Cited

FOREIGN PATENT DOCUMENTS

| | | |
|---|---|---|
| 2005633 | 9/1971 | Fed. Rep. of Germany ...... 297/335 |
| 2147698 | 3/1973 | Fed. Rep. of Germany ..... 296/65.1 |
| 3540577 | 5/1986 | Fed. Rep. of Germany ..... 296/65.1 |
| 2351819 | 5/1976 | France .................................. 296/69 |
| 2524285 | 10/1983 | France ................................ 297/335 |

Primary Examiner—Janice K. Crammer
Assistant Examiner—James M. Gardner
Attorney, Agent, or Firm—Oldham & Oldham Co.

[57] ABSTRACT

A vehicle seat of a hinged type wherein a seat cushion is rotatable about its forward pivot point to an upright position and a seat back is rotatable about its rearward pivot point to a horizontally laying position, the locking arrangement thereof being such that a lock member having a latch hole is provided at the rearward end of the seat cushion, whereas a stopper is defined at the lower end of the seat back, so that, when the seat cushion tends to rotate upwardly with a great force, the stopper at the seat back is to be engaged into the latch hole of the seat cushion.

3 Claims, 3 Drawing Sheets

PIVOTING SEAT AND PIVOTING BACKREST HAVING COOPERATING LATCH MEANS

BACKGROUND OF THE INVENTION

1. Field of the Invention

The present invention relates to a vehicle seat of a foldable type permitting a seat formation and a load-carrying platform formation, and in particular to a hinged rear seat of the same type.

2. Description of Prior Art

Typically, an ordinary rear seat used in a vehicle having capacity to accomodate both occupant and load or baggages therein is basically composed of a seat cushion (1), of which the front part is rotatably pivoted on the floor and a seat back (7) which is rotatably pivoted at its lower part on the body of the vehicle, as shown in FIG. 1.

Now, reference being made to FIGS. 1 through 5, a description will be made of such a conventional hinged seat. The seat cushion (1) is free to rotate at the forward pivot point (2) between the horizontally laying position as in FIG. 1 and the uprightly erecting position as in FIG. 4. The rearward end part of such seat cushion (1) is provided with a lock member (4) by a bracket (5) such that the lock member (4) is rotatable about the pivot point (3). A pull strap (6) is fixed at the free end of the lock member (4). The seat back (7) is free to rotate at the lower pivot point (8) between the uprightly erecting position as in FIG. 1 and the horizontally laying position as in FIG. 4. A stopper member (9) is fixed at the lower end of the seat back (7).

As shown in FIG. 1, where the seat cushion (1) is set in the horizontally laying position, the lock member (4) is oriented in a direction rearwardly of the seat cushion (1), leaning against the bracket (5). Under such state, the free end of the lock member (4) faces towards the lock member (4) with a given distance therebetween, but, when the seat cushion (1) is applied, there is a great upwardly pulling force, and seat cushion is to be thrown out upwardly, the lock member (4) collides with the stopper member (9), thereby preventing the seat cushion (1) against further upward rotation beyond the junction between the seat cushion (1) and seat back (7), and thus protecting an occupant sitting thereon against damage.

With the above structure, when it is desired to rotate the seat cushion (1) to the uprightly erectting position, the pull strap (6) is first pulled so as to cause upward rotation of the lock member (4) as indicated by the arrow in FIG. 5 to such an erecting unlocked position indicated by the phantom line in FIG. 5, where the lock member (4) is placed in a condition to be from the latch engagement with the stopper member (9), and then secondly, is further pulled in a forward direction of the seat cushion (1), so that the seat cushion (1) is caused to rotate about the pivot point (2) and stands erects as in FIG. 4.

Then, the seat back (7) may be rotated forwardly about the pivot point (8) to the horizontally laying position as in FIG. 4, where the rear-side surface (7a) of the seat back (7) is brought in registry with a load-carrying platform, which thus increases the area of that platform.

However, the lock member (4) rests upon the bracket (5), simply under gravity, extending such as to be latchwise engageable with the stopper member (9), and as consequence thereof, when a great load is applied to the seat cushion (1), tending to throw the same upwardly, the lock member (4) per se is easily rotated about the pivot point (3) upwardly to the unlocking position as indicated by the arrow (a) in FIG. 5, just before the seat cushion (1) is rotated, as a result of which, the free end of the lock member (4) is slipped upon or slidingly disengaged from the surface of the stopper member (9), and thus the seat cushion (1) is thrown up with an exceptional impact.

SUMMARY OF THE INVENTION

In order to alleviate the above disadvantage, it is therefore a purpose of the present invention to provide an improved hinged seat which positively prevents an excessive upward rotation of a seat cushion due to a slippery disengagement between a lock member and stopper member.

The present invention is based on the above-stated prior-art hinged seat which comprises the seat cushion which is rotatably pivoted at its forward end part and the seat back which is rotatably pivoted at its lower end part, and to achieve such purpose, in accordance with the present invention, a lock member having a latch protrusion is rotatably pivoted at the rearward end part of the seat cushion and further a latch hole is defined at the lower end of the seat back in such a manner that the latch protrusion is to be caught in or engaged into the latch hole when the seat back is suddenly rotated upwardly with a great force. The latch protrusion may be provided at the lower end part of the seat back and the latch hole may be defined at the rearward end part of the seat cushion. Accordingly, the engagement between the latch protrusion and hole, which affects the seat cushion when a great upward force is applied, will insure avoidance of such excessive upward rotation of the seat cushion.

DETAILED DESCRIPTION OF PREFERRED EMBODIMENT OF THE INVENTION

First, the present invention is directed to provide an improvement on the basis of the aforementioned conventional hinged seat, and it should be understood that all like designations appearing hereinafter refers to all like designations in the prior art description above as well as in FIGS. 1 through 5, and no further specific explanation is made on the corresponding parts and elements.

Figure 6:
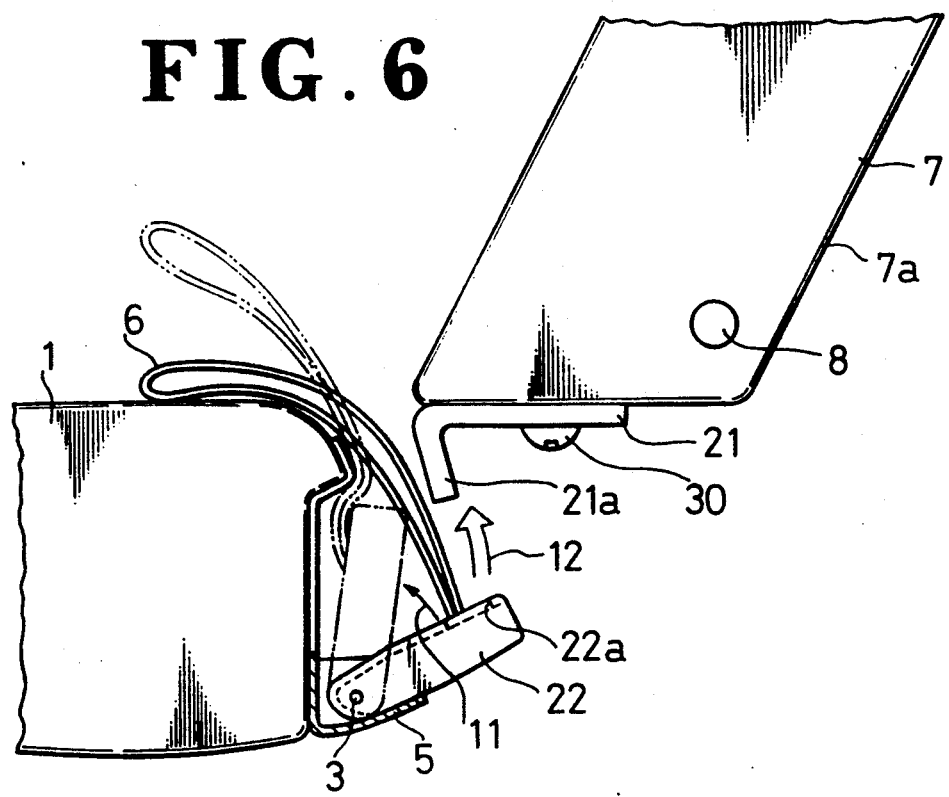
FIG. 6 is a partially broken side view of a principal part of the present invention.
Figure 7:
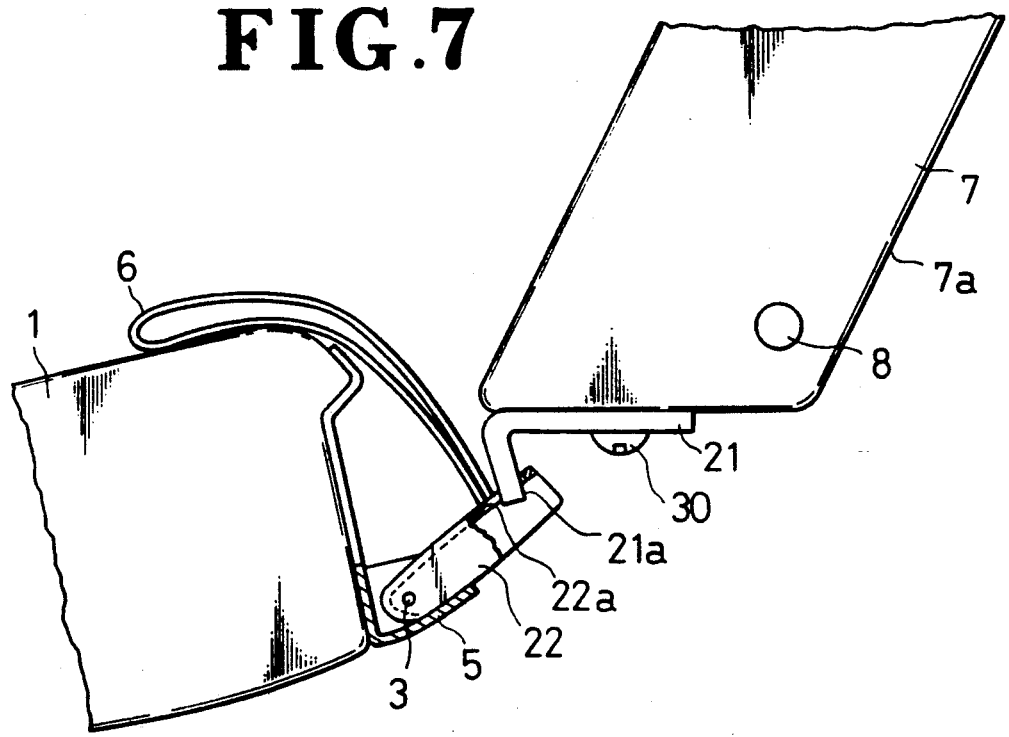
FIG. 7 is a partially broken side view shown in the FIG. 6, showing the motions of a lock member.
Figure 8:
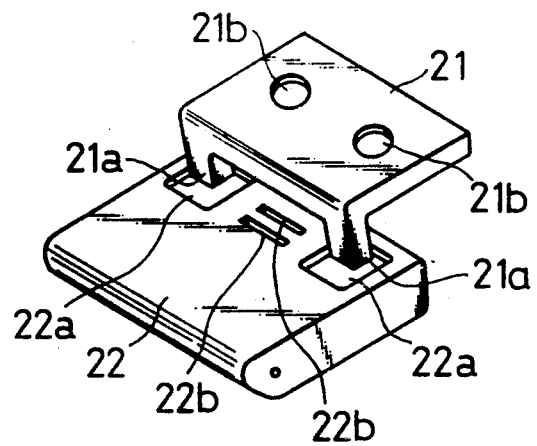
FIG. 8 is a perspective view of the lock member and a stopper in accordance with the invention.

Referring now to FIGS. 6 through 8, illustrative is the principal parts of the hinged seat in accordance with the present invention.

Figure 1:
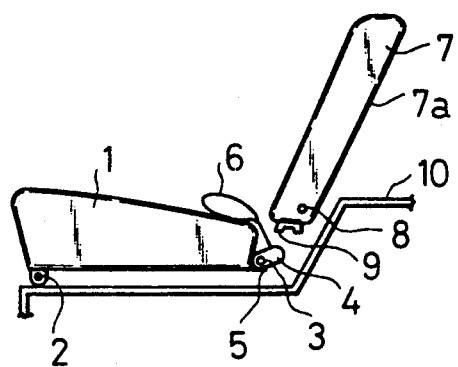
FIGS. 1 through 4 are a schematic explanatory views of a conventional hinged seat with a lock member, showing the motions of the seat and lock member.
Figure 2:
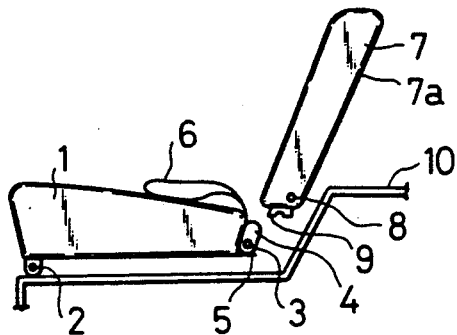
Figure 3:
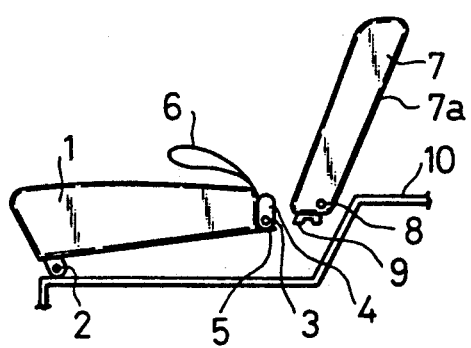
Figure 4:
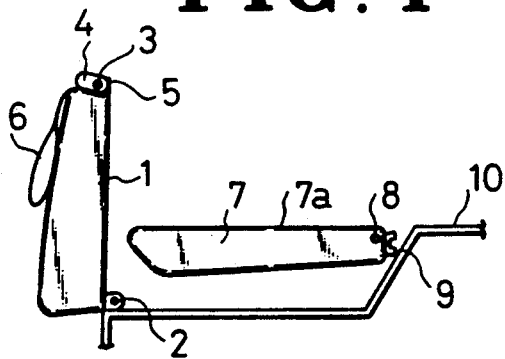
Figure 5:
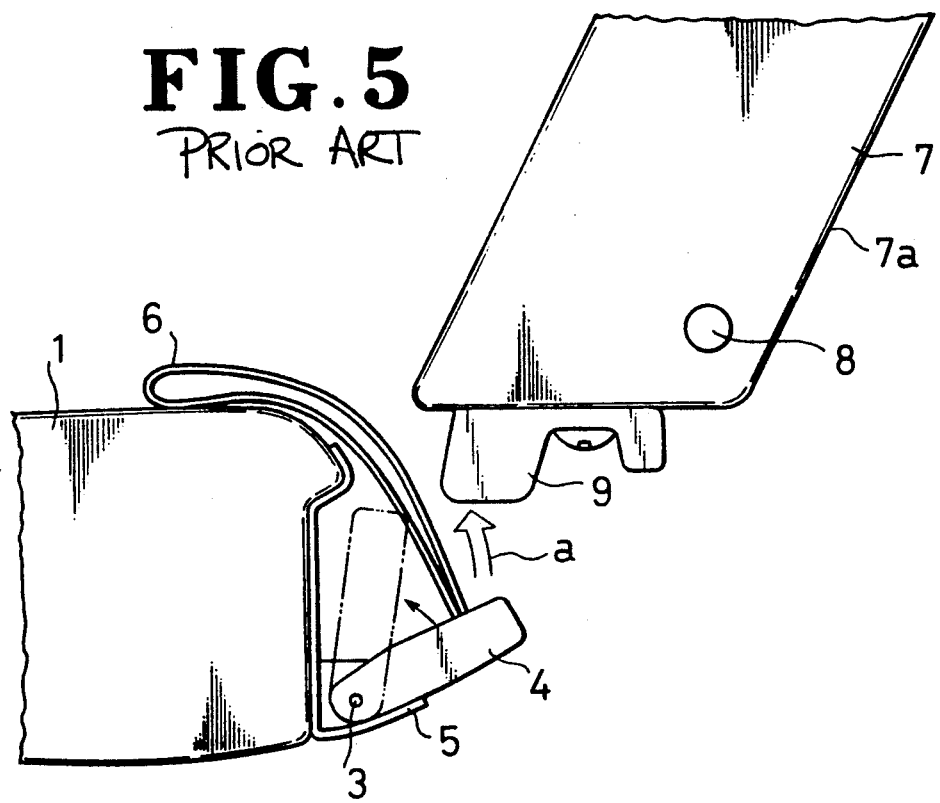
FIG. 5 is a partially enlarged side view of the conventional seat.

Designation (21) denotes a stopper member of a generally L-shaped configuration in section, which is fixed on the lower end of the seat back (7), with the forward free end of the stopper member (21) being bent downwardly to form a pair of spaced-apart dependent latch protrusions (21a)(21a). As shown in FIG. 7, a pair of holes (21b)(21b) are formed in the upper flat surface of the stopper member (21). By fixing two screws (30) through those respective two holes (21b)(21b) to the end of the seat back (7), the stopper member (21) is fixedly secured thereto as shown in FIGS. 1 and 2. Preferably, the two latch protrusions (21a) (21a) extends and slants inwardly, as shown, for a positive latch engagement purpose to be stated later.

Designation (22) denotes a lock member which is rotatably pivoted at the pivot point (3) defined in the bracket (5). Normally, as in FIG. 6, the lock member (22) leans against the bracket (5) under gravity and may be rotated about the pivot point (3) to an upright erecting position indicated by the phantom line. As best shown in FIG. 8, the lock member (22) is at its upper surface formed with a pair of spaced-apart latch holes (22a) (22a) such that they are each disposed at the respective right and left corners of the forward free end part of the lock member (22), and that they are arranged therein in a manner being corresponding with the two latch protrusions (21a) (21a) to thereby permit free egagagement of the latch protrusions (21a) (21a) thereinto. Further, at the same upper surface of the lock member (22), are formed a pair of strap securing holes (22b) (22b) of an elongated shape, each extending in a sense to transverse the lock member (22) and being disposed between the pair of latch holes (22a) (22a). The pull strap (6) is folded to the double lines and its tow terminating end areas pass through the respective securing holes (22b) (22b) so as to be secured thereat, as illustrated in FIG. 6.

The two latch holes (22a) (22a) are directed towards the respective two latch protrusions (21a) (21a) when the lock member (22) is in such a rearwardly laying position, resting upon the bracket (5), so that the seat cushion (1), when applied a great load attempting to throw same upwardly, is prevented against further upward movement by virtue of the two latch protrusions (21a) (21a) being inserted or engaged into the two latch holes (22a) (22a) respectively, thereby establishing a locked state of the seat cushion (1) relative to the seat back (7).

Accordingly, the excessive upward rotation of the seat cushion (1), which might cause critical damage to an occupant thereon, is avoided almost completely.

It should be noted that, in contrast to the above-embodiment, the two latch protrusions (21a) (21a) may be formed at the lock member (22) and the two latch holes (22a) (22a) may be formed at the stopper member (21). The present invention is therefore not limited to the illustrated embodiment, but any other modifications, replacements and additions may structurally be possible without departing from the spirit and scope of the appended claims.

What is claimed is:

1. A hinged seat for a vehicle comprising:
   a seat back which is rotatably pivoted at its lower end part;
   a seat cushion which is rotatably pivoted at its forward end part;
   a stopper means provided at a lower end part of said seat back;
   a lock means provided at a rearward end part of said seat cushion and at the lower end of said seat back, said lock means comprising:
   a first latch means comprising a pair of spaced apart protrusions latch and a second latch means comprising a pair of spaced apart latch holes;
   one of said latch means being mounted on the rearward end of said seat cushion and the other of said latch means being mounted in the lower end of said seat back;
   whereby, when said seat cushion is rotated upwardly, said first latch means is caught by or engaged with said latch means to thereby lock said seat back against further upward rotation.

2. The hinged seat according to claim 1, wherein said pair of spaced-apart latch protrusions which bent are downward to a forward integral part of one of said lock means and stopper means, and wherein said pair of spaced-apart latch holes are so defined as to correspond with the respective said pair of latched protrusions.

3. The hinged seat according to claim 1, wherein said first latch means is defined at said stopper means whereas said second latch means is defined at said lock means, wherein said first latch means comprises at least one latch protrusion and said second latch means comprises at least one latch hole in which said latch protrusion is to be caught or engaged.

* * * * *